United States Patent [19]

Kumazaki

[11] 4,327,254
[45] Apr. 27, 1982

[54] RINGER CIRCUIT FOR TELEPHONE

[75] Inventor: Katsuaki Kumazaki, Tokyo, Japan

[73] Assignee: Tandy Corporation, Fort Worth, Tex.

[21] Appl. No.: 129,164

[22] Filed: Mar. 10, 1980

[30] Foreign Application Priority Data

Mar. 8, 1979 [JP] Japan ................... 54-28661[U]

[51] Int. Cl.³ .............................................. H04M 1/00
[52] U.S. Cl. ................................................. 179/84 T
[58] Field of Search .................. 179/84 R, 84 L, 84 T

[56] References Cited
U.S. PATENT DOCUMENTS

| | | | |
|---|---|---|---|
| 3,254,161 | 5/1966 | Svala | 179/84 T |
| 3,291,916 | 12/1966 | Jorgensen | 179/84 T |
| 3,466,403 | 9/1969 | Combridge et al. | 179/84 T |
| 3,731,004 | 5/1973 | Cowpland et al. | 179/84 T |

FOREIGN PATENT DOCUMENTS 2049346 4/1972 Fed. Rep. of Germany .... 179/84 T

OTHER PUBLICATIONS

The Radio Amateur's Handbook, 1972, "Rectifier Circuits", pp. 106-107.

Primary Examiner—Bernard Konick
Assistant Examiner—J. A. Popek
Attorney, Agent, or Firm—Gary V. Pack

[57] ABSTRACT

A ringer circuit for a telephone is disclosed which is equipped with a transformer, having its primary winding connected to the telephone line through hook-switches. The secondary winding of the transformer is connected to a rectifying circuit so that it may convert the high voltage and low current of the ringer signal received into a secondary ringer signal having high current and low voltage. This secondary ringer signal is rectified and fed to an oscillator which drives a sound generator to provide a call signal.

4 Claims, 4 Drawing Figures

Fig. 1
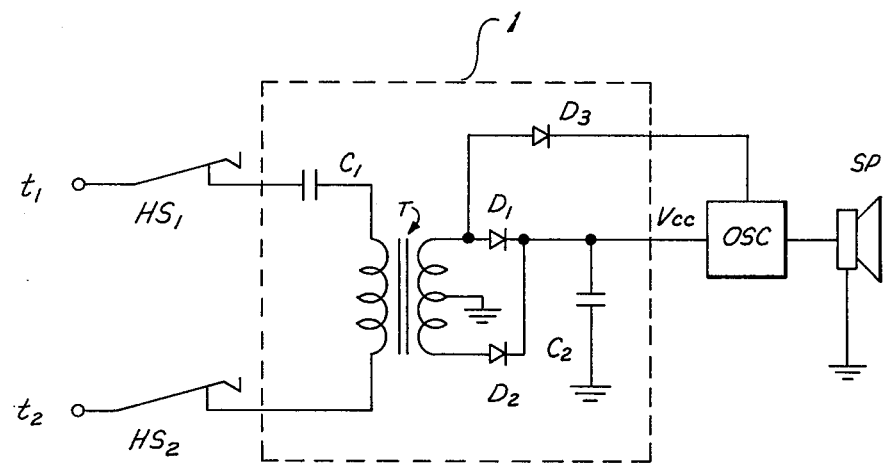
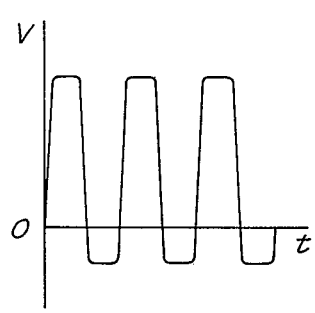
Fig. 2(A)
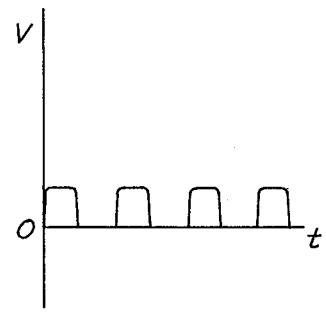
Fig. 2(B)
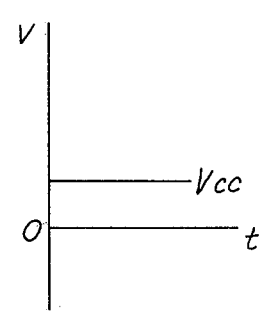
Fig. 2(C)

RINGER CIRCUIT FOR TELEPHONE

BACKGROUND OF THE INVENTION

The present invention relates to a telephone ringer circuit for producing a call signal.

Prior art telephone ringer circuits with a mechanical bell often have poor tone quality and occupy a significant amount of space inside the telephone housing. To overcome these drawbacks, an electronic oscillator is used to drive a speaker, or the like, to produce a call signal. Such systems require external electric power to be supplied to the oscillator from the telephone line, because no components in the telephone circuit itself provided power to drive the oscillator.

More specifically, when the telephone receiver is left unlifted, a DC voltage of 48 volts from the telephone line is provided to the ringer circuit. In a ringer circuit with an oscillator, if a DC current flows into the ringer circuit, a telephone exchange may cause a malfunction. In order to prevent this malfunction, the DC resistance of the ringer circuit has to be high so that only the incoming ringer signals having low frequency and low current are passed. Thus, prior art telephone circuits have not included ringer circuits powered by telephone line signals.

SUMMARY OF THE INVENTION

It is therefore an object of the present invention to provide a ringer circuit for a telephone which uses the ringer signals as the power source.

According to a feature of the present invention, a transformer is used to convert the ringer signal to a secondary ringer signal having a lower voltage, but a higher current level, which drives an oscillator. Sufficient current levels at the transformer secondary can usually be obtained for driving the oscillator despite low current levels at the transformer primary. As a result, the oscillator can be used without the requirement for an additional power source, which in turn reduces the physical size of the ringer circuit and the number of components required. Since, moreover, the telephone line DC current is blocked by a DC current blocking capacitor which is connected in series with the primary winding of the transformer, malfunctions caused by telephone exchanges can be prevented.

BRIEF DESCRIPTION OF THE DRAWING

FIG. 1 is a circuit diagram showing one embodiment of the present invention.

FIGS. 2(A), 2(B), and 2(C) are illustrative views showing the voltage waveforms at portions of the circuit during its operation.

DESCRIPTION OF THE PREFERRED EMBODIMENT

Referring to FIG. 1, reference numeral 1 indicates a circuit for producing a driving output signal in response to the receipt of ringer signal from the telephone line. Driver circuit 1 is connected to the incoming telephone line at terminals $t_1$ and $t_2$, through hook-switches $HS_1$ and $HS_2$. A transformer T has its primary winding connected to hook-switches $HS_1$ and $HS_2$ in series with blocking capacitor $C_1$. The secondary winding of transformer T has its center-tapped terminal grounded, with either end of the secondary winding connected to diodes $D_1$ and $D_2$. The outputs of the diodes $D_1$ and $D_2$ are combined to produce an output driving signal $V_{cc}$.

As a result, an AC signal received at the primary winding of transformer T is rectified to produce a DC output signal, $V_{cc}$. Capacitor $C_2$ is connected to the combined outputs of diodes $D_1$ and $D_2$ to smooth out the output signal. If desired, diode $D_3$ may be connected from input of diode $D_1$ to the trigger input of an oscillator so that the output of the oscillator is pulsed.

As is further shown in FIG. 1, an oscillator and a speaker are connected to the outputs of driving circuit 1 to produce an audible call signal in response to output signal $V_{cc}$ from driving circuit 1.

Hook-switches $HS_1$ and $HS_2$ are mechanically connected in a fashion as is well known in the art, such that when the telephone receiver is picked up from the telephone by the user, $HS_1$ and $HS_2$ move from a "closed" position to an "open" position, thereby disconnecting the ringer circuit of a telephone line. When the receiver is replaced on the telephone housing, thereby placing $HS_1$ and $HS_2$ in their "closed" positions, a DC signal is again continuously supplied to the ringer circuit at $t_1$ and $t_2$. The level of this current is normally around 48 VDC. However, because of DC blocking capacitor $C_1$, no DC current is provided to the primary winding of transformer T. The value of capacitor $C_1$ is selected such that only frequencies corresponding to those used for the ringer input signal will be passed to the primary winding of transformer T.

A typical ringer input signal received over the telephone line is illustrated in FIG. 2(A). As is known in the prior art, the input and outut current and voltage levels for transformer T are inversely related to each other. The AC voltage appearing on the transformer primary is therefore correspondingly reduced to a lower level in the secondary winding, and, once rectified by diodes $D_1$ and $D_2$, achieves a low level as shown in FIG. 2(C). A low current level in the primary winding is transformed into a high current level in the secondary winding. The net result is a creation of an output driving signal having a high current level for driving the oscillator, which is identified as $V_{cc}$.

The oscillator generates a signal in response to $V_{cc}$ which is inputed into speaker SP to create an audible call signal to indicate an incoming telephone call. If a pulsed output is desired, a third diode, diode $D_3$, can be connected between the transformer secondary into the trigger input for the oscillator. This permits a half-wave rectified signal, as is shown in FIG. 2(B) to be produced by diode $D_3$ and inputed into the oscillator. Speaker SP is then pulsed to produce a pulsed output call signal. Once the telephone receiver is lifted by the user, hook-switches $HS_1$ and $HS_2$ are opened, thereby interrupting the incoming ringer signal to transformer T, and terminating the sound generation.

Although the embodiment illustrated uses a speaker as a sound generator, it can be appreciated that the speaker may be replaced by other types of sound transducers or a piezo-electric element. In another alternative, diode $D_3$ may be eliminated, so that the sound produced is continuous.

While a particular embodiment of this invention has been shown and described, it is obvious that changes and modifications can be made without departing from the true spirit and scope of the invention. It is the intention in the appendant claims to cover all such changes and modifications.

The invention claimed is:

1. A ringer circuit for a telephone, comprising: a transformer having its primary winding connected through hook-switches with the circuit of the telephone; a DC current blocking capacitor connected in series with the primary winding of said transformer; a rectifying circuit for rectifying the secondary voltage of said transformer; an oscillator for providing an oscillating output in response to the rectified output of said rectifying circuit; a sound generator for generating sounds in response to the oscillating output of said oscillator; and a diode operatively connected between the transformer and the oscillator so that the secondary voltage of said transformer is half-wave rectified to generate a trigger voltage which is provided to the oscillator, so that the oscillating output of the oscillator has an interrupted waveform applied to the sound generator.

2. A ringer circuit for a telephone, said telephone having hook-switches operating in response to the telephone receiver being lifted from the telephone housing, thereby enabling an input ringer signal from the telephone line connected to the telephone to be transmitted to the ringer circuit when the receiver is resting on the telephone housing, said ringer circuit comprising:
   (a) means for preventing direct current in the telephone line from being received by the ringer circuit;
   (b) means for converting primary alternating current ringer signals received from the telephone line to an alternating current secondary ringer signal having a lower voltage level and a higher current level than in the primary ringer signal;
   (c) sound generating means operating in response to the secondary ringer signal to produce an audible call signal; and
   (d) half-wave rectifying means for producing a half-wave rectified signal from the secondary ringer signal, said half-way rectifying means connected to the sound generation mens so that the call signal produced by the sound generation means has a pulsed waveform.

3. A ringer circuit for a telephone, said telephone having hook-switches operating in response to the telephone receiver being lifted from the telephone housing, thereby enabling an input ringer signal from the telephone line connected to the telephone to be transmitted to the ringer circuit when the receiver is resting on the telephone housing, said ringer circuit comprising:
   (a) means for preventing direct current in the telephone line from being received by the ringer circuit;
   (b) transformer means having a primary and secondary winding, for converting primary alternating current ringer signals received from the telephone line to an alternating current secondary ringer signal having a lower voltage level and a higher current level than the primary ringer signal;
   (c) full-wave rectifying means for converting the secondary ringer signal to a direct current signal, wherein the full-wave rectifying means comprises a ground connected to the center-tap of the secondary winding of the transformer and two diodes with their inputs connected to either side of the secondary winding and having their outputs connected together for producing a driving signal;
   (d) oscillator means for producing an output signal at the predetermined frequency in response to receipt of a driving signal from the rectifying means, said oscillator means having a trigger circuit input;
   (e) transducer means for producing an audible ring at a frequency related to the predetermined frequency of the output signal from the oscillator means;
   (f) half-wave rectifying means connected between the secondary winding of the transformer means and the trigger circuit input to the oscillator so that the oscillator produces a pulsed output signal for driving the transducer means.

4. The ringer circuit recited in claim 3, wherein the half-wave rectifying means comprises a diode connected at the input of one of the diodes in the full-wave rectifying means, with the output of the diode connected to the trigger circuit input to the oscillator.

* * * * *